(12) United States Patent
Montague

(10) Patent No.: US 6,609,141 B1
(45) Date of Patent: Aug. 19, 2003

(54) METHOD OF PERFORMING MODULAR INVERSION

(75) Inventor: Paul Montague, Highbury (AU)

(73) Assignee: Motorola, Inc., Schaumburg, IL (US)

( * ) Notice: Subject to any disclaimer, the term of this patent is extended or adjusted under 35 U.S.C. 154(b) by 501 days.

(21) Appl. No.: 09/687,207

(22) Filed: Oct. 13, 2000

(51) Int. Cl.[7] ................................................ G06F 7/38
(52) U.S. Cl. ...................................................... 708/491
(58) Field of Search ................................ 708/491–492, 708/277, 512, 517; 380/28

(56) References Cited

U.S. PATENT DOCUMENTS 5,448,639 A * 9/1995 Arazi .......................... 708/491

OTHER PUBLICATIONS

[KNU] *The Art of Computer Programming, 2nd et, vol. 2: Semi–numerical Algorithms,* D.E. Knuth, Addison–Wesley, 1981.

[MEN] *Handbook of Applied Cryptography,* A.J. Menezes, P.C. vanOorschot and S.A. Vanstone, CRC Press, 1996. pp. 67, 325, 608, 329–330.

[RSA] *A Method for Obtaining Digital Signatures and public Key Cryptosystems,* R.L. Rivest, A. Shamir and L. Adleman, Communications of the ACM, 21 (1978), 120–126.

[PKC1] *PKCS#1 RSA Cryptography Specifications v2.0,* RSA Laboratories, Sep. 1998.

* cited by examiner

*Primary Examiner*—Tan V. Mai
(74) *Attorney, Agent, or Firm*—Daniel K. Nichols

(57) ABSTRACT

As part of a process to generate a private key for RSA™ digital signature generation on a smartcard, it is necessary to determine a modular inverse $e^{-1}$ mod m of a data value e. In order to determine the modular inverse from a data value e and a value of m for the inversion, the value of m mod e is calculated by determining a remainder value r of m divided by e and then an inverse $t = r^{-1}$ mod e is determined. The modular inverse $e^{-1}$ mod m is then determined utilising at least the value t by determining a value w=e−t and then determining $e^{-1}$ mod m by computing (q*w)+1+the integer part of ((w*r)/e).

6 Claims, 2 Drawing Sheets

METHOD OF PERFORMING MODULAR INVERSION

FIELD OF THE INVENTION

This invention relates to a method of performing a modular inversion, especially, though not exclusively, in the context of generating so-called RSA™ public and private key pairs.

BACKGROUND OF THE INVENTION

In the RSA™ cryptographic scheme, an RSA key pair consists of an RSA public key and an RSA private key. Further information regarding the RSA scheme can be found in an article entitled "A Method of Obtaining Digital Signatures and Public Key Cryptosystems" by R. L. Rivest, A. Shamir & L. Adleman, published in Communications of the ACM, Vol 21 (1978), pages 120–126. The public and private keys are generated by some agent and then typically assigned to a particular user. The user makes use of the private key for generating digital signatures and for decrypting messages, and distributes the public key so that other users may verify the signatures generated or encrypt messages to be sent to the user in question. Often, the private key resides on a smart card because this class of device offers both secure storage and secure usage of the key.

It is also becoming increasingly common, because of needs for higher levels of security in some contexts, that there are requirements for RSA keys used by smart cards to be generated by the card itself. In this case, the private key data is never, at any stage, available off the card. It is only recently that smart cards have reached the levels of computational capability necessary to make this key pair generation feasible within an acceptable time.

A valid RSA public key, consists of the following data:
- a modulus n, which is a non-negative integer equal to the product of two odd primes p and q; and
- a public exponent e, which is a non-negative integer between 3 and n−1 inclusive, and whose greatest common divisor with l(n) is 1. Here l(n) is the least common multiple of both p−1 and q−1.

A valid RSA private key, in one of the two common representations, consists of the following data:
- a modulus n, equal to that in the corresponding RSA public key; and
- a private exponent d, which is a positive integer less than n satisfying e d=1 mod l(n). By "mod" is meant modular reduction, i.e. the remainder when e d is divided by l(n) is equal to 1.

The public key is typically used to encrypt data, while the corresponding private key may be used to decrypt data so encrypted. Alternatively, the private key may be used to sign data. The corresponding public key may then be used to validate the signature so computed.

Typically in RSA key pair generation, the public exponent e is specified to be some predefined value. It is advantageous that this value be prime (so that the condition that the greatest common divisor of e and l(n)=1 is more likely to hold), and that its binary representation consist of as few non-zero digits as possible (so that exponentiation computations using it are fast). Typical values used in practice are 3, 17, 257 and 65537. This is a very small value in relation to the typical size of the modulus (200–300 digits) required for reasonable levels of security.

During key generation therefore, having computed the modulus by whatever means are appropriate, the problem is then, given the value e, to compute the corresponding private exponent d. Since e d=1 mod l(n), it is required to compute $d=e^{-1}$ mod l(n). This so-called modular inversion is the operation with which the present invention is concerned. The method is one which should be suitable for implementation on memory constrained devices, such as smart cards, under the typical constraints on the value of e noted above.

It should be noted that the other common representation of the RSA private key data is in the so-called Chinese Remainder Theorem form. In this form, the factors p and q of the modulus are stored, as well as the values dp=d mod p−1 and dq=d mod q−1. The purpose of storing the key data in this form is that operations using the private key can then typically be performed much more quickly. The two values dp and dq represent the private exponent d. Their relation to the public exponent e is given by: $dp=e^{-1}$ mod p−1 and $dq=e^{-1}$ mod q−1. In other words, two modular inversions are required in this case. Hence, the method of the present invention is also relevant, i.e. an efficient computation of the modular inverse is required.

To summarize, the object of the present invention is to provide an efficient method for modular inversion. This is of specific use in the context of RSA key generation in smart cards. Also, it may be of use in other applications requiring modular inversion operations with values of input parameters restricted as is typical for RSA.

There are a number of methods available for modular inversion. In particular, the most commonly used are, or are variants of, the following two methods:
- the extended Euclidean algorithm,
- the binary extended GCD algorithm (see algorithms 2.107 and 14.61 in the book "Handbook of Applied Cryptography" by A. J. Menezes, P. C. van Oorschot and S. A. Vanstone, CRC Press, 1996, and algorithm X in section 4.5.2 of "The Art of Computer Programming. Volume 2 Seminumerical Algorithms" by D. Knuth, Addison Wesley, 1981). It should be noted that variants such as Lehmer's algorithm (algorithm L in section 4.5.2 of "The Art of Computer Programming. Volume 2 Seminumerical Algorithms" by D. Knuth, Addison Wesley, 1981) are not considered here since they are complex (large code size) algorithms unsuitable for the smart card applications.

The drawbacks of these methods are similar in that both have sizeable requirements in terms of RAM usage for temporary variables, together with significant requirements in terms of code size. In the context of smart card applications, these issues are of great significance. Another drawback of the known methods is that it is common, in practice, that cryptographic coprocessors available on smart card platforms are restricted to support modular arithmetic operations with only odd values for the modulus, since use is made of Montgomery arithmetic. In this case direct application of the conventional inversion techniques to the original problem with hardware support for the relevant arithmetic operations may prove problematic, since e.g. l(n) is even.

BRIEF SUMMARY OF THE INVENTION

The present invention therefore seeks to provide a method of performing a modular inversion, which overcomes, or at least reduces, the above-mentioned problems of the prior art.

Accordingly, in a first aspect, the invention provides a method of determining a modular inverse $e^{-1}$ mod m of a data value e, the method comprising the steps of:
- (i) determining the value of the data value e;
- (ii) determining a value of m for the inversion;

(iii) calculating the value of m mod e by determining a remainder value r of m divided by e;

(iv) determining an inverse $t=r^{-1}$ mod e; and (v) determining the modular inverse $e^{-1}$ mod m utilising at least the value t.

In preferred embodiments, the step (iv) of determining an inverse $t=a^{-1}$ mod e, is performed either by computing $a^{e-2}$ mod e if e is prime or by using the extended Euclidean or binary extended GCD algorithms for more general values of e.

Preferably, the method is utilized in an RSA™ cryptographic system to generate a private exponent d used to determine an RSA™ private key for the cryptographic system. The method is preferably carried out by a processor on a smartcard.

BRIEF DESCRIPTION OF THE DRAWINGS

Two embodiments of the invention will now be more fully described, by way of example, with reference to the drawings, of which.

DETAILED DESCRIPTION OF THE DRAWINGS

A first embodiment of the present invention involving exponentiation to perform the modular inversion will now be described with reference to FIG. 1. This is applicable in the case that e is a prime number. This is a common case in practice, since using prime values for e make it more likely that the inverse exists.

Firstly, the data values e and m are determined in step 1 such that e is prime. In step 2, the remainder r and quotient q of the modulus m on division by the data value e are computed. Then, in step 22, r is checked to determine whether it is zero. If r=0 then the process flow goes to step 23 to indicate failure and stop. If r≠0, then the process flow goes on to step 3, where the value $t=r^{-1}$ mod e is determined by computing $r^{e-2}$ mod e. It is this interchange of the operands in the inversion which is one of the important elements of the present invention.

In the next step 4, the inverse t is replaced by the difference of e and t, i.e. t=e−t. Then, in step 5, the quotient q is replaced by the product of q and t, i.e. q=q*t. Finally, in step 6, the result $e^{-1}$ mod m is computed as the following expression: q+1+((t*r)/e), where division is meant to indicate that only the integer part of the result is retained.

Figure 1:
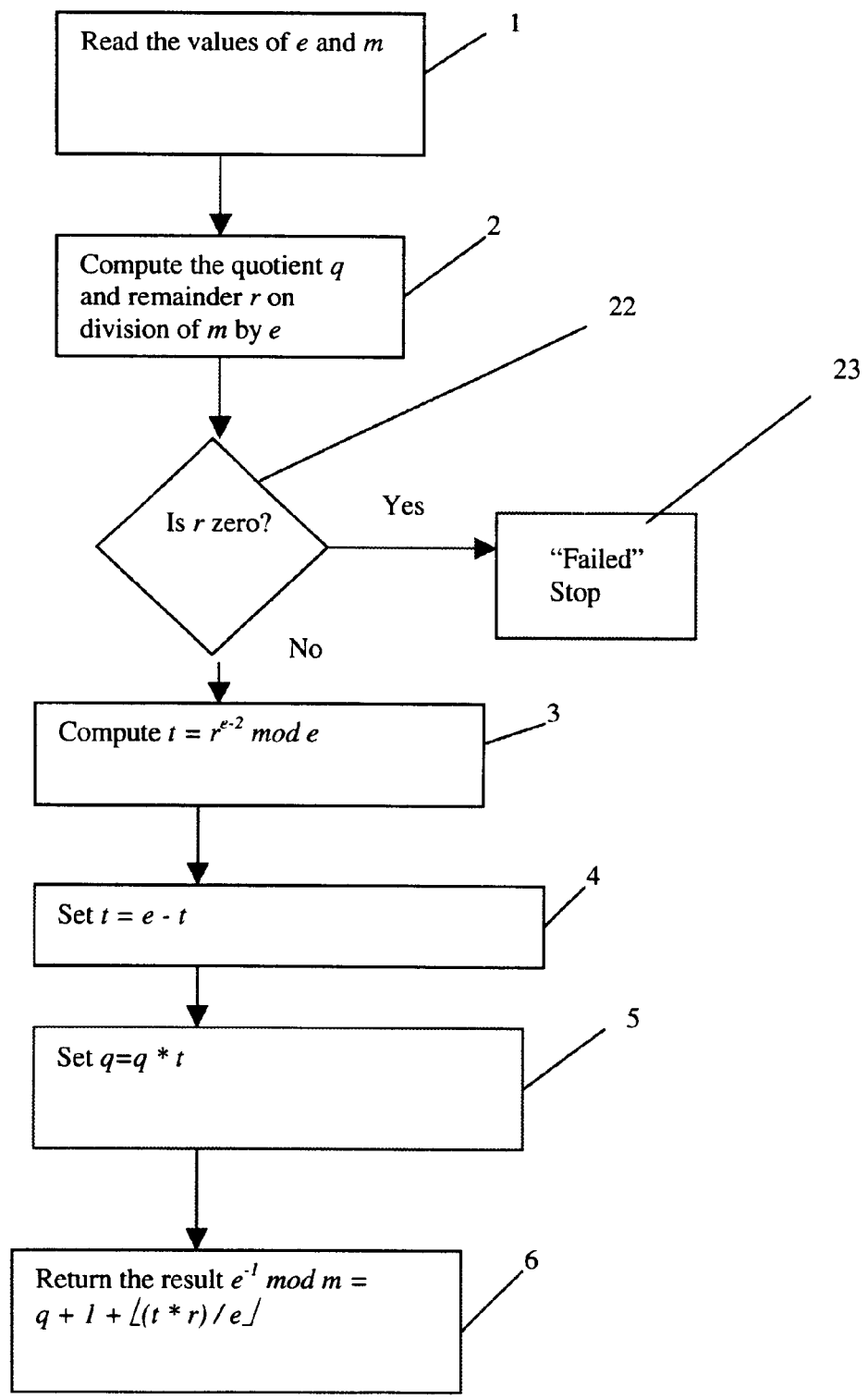
FIG. 1 shows a flow chart of a method for computing the modular inverse using a modular exponentiation step to perform the inversion modulo the small parameter e, according to a first embodiment of the invention.

To further illustrate the process described above, numerical examples of the calculations will now be provided. For the sake of simplicity, the value of the parameter m chosen is not of a size which would be used in a realistic implementation. The values chosen are:

Inputs e=5, m=176568;

Following the process of FIG. 1, step 1 involves simply reading in the values of e and m.

Thereafter:

Step 2: Compute q=integer part of m/e=integer part of 176568/5=35313.

Compute r=m mod e=176568 mod 5=3.

Step 3: Compute $t=r^{e-2}$ mode=$3^3$ mod 5=2.

Step 4: Compute t=e−t=5−2=3.

Step 5: Compute q=q*t=35313*3=105939.

Step 6: Compute q+1+integer part of ((t*r)/e)=105939+ 1+integer part of ((3*3)/5)=105941.

It will be noted that 105941*e mod m=105941*5 mod 176567=529705 mod 176567=1, verifying that the answer is correct. Also note that in step 3 no large numbers appear. All operands are of the order of e rather than that of m.

A second embodiment, which involves performing the inversion step using the extended Euclidean algorithm will now be described with reference to FIG. 2. This is applicable in the case that e is a small, but not necessarily prime, number.

Firstly, the data values e and m are determined in step 7. In step 8, the remainder r and quotient q of the modulus m on division by the data value e are computed. Then, in step 21, both r and e are checked to determine whether they are even. If they are, then the process flow moves to step 9 to indicate failure and stop. If both r and e are not even, then in the following steps 10–17, the value $t=r^{-1}$ mod e is determined by application of the binary extended GCD algorithm. Again, it is this interchange of the operands in the inversion which is one of the important elements of the present invention. These steps generally follow those of Algorithm 14.61 in the book "Handbook of Applied Cryptography" by A. J. Menezes, P. C. van Oorschot and S. A. Vanstone, CRC Press, 1996, as follows:

In step 10, set u=e, v=r, A=1, B=0, C=0, D=1. Then, in step 11, if u is even the process moves to step 12 until u is odd, at which time the process flow moves to step 13. Thus, in step 12, if A=B=0 mod 2 then u is set to u=u/2, A=A/2 and B=B/2, otherwise u is set to u=u/2, A=(A+r)/2 and B=(B−e)/2. Similarly, in step 13, if v is even then the process flow moves to step 14 until v is odd, at which time the process flow moves to step 15. Thus, in step 14, if C=D=0 mod 2 then v is set to v=v/2, C=C/2 and D=D/2, otherwise v is set to v=v/2, C=(C+r)/2 and D=(D−e)/2. Then, in step 15, if u>=v then u is set to u=u−v, A=A−C and B=B−D, otherwise v is set to v=v−u, C=C−A and D=D−B. The process then moves to step 16, where it is determined whether u=0. If u is not 0 then the process moves back to step 11. If u is 0 then the process moves on to step 17, where the inverse t is set to t=D mode. Then, in step 18, the inverse t is replaced by the difference of e and t, i.e. t=e−t. In step 19, the quotient q is replaced by the product of q and t, i.e. q=q*t and finally, in step 20, the result $e^{-1}$ mod m is computed as the following expression: q+1+((I*r)/e), where division is meant to indicate that only the integer part of the result is retained.

Figure 2:
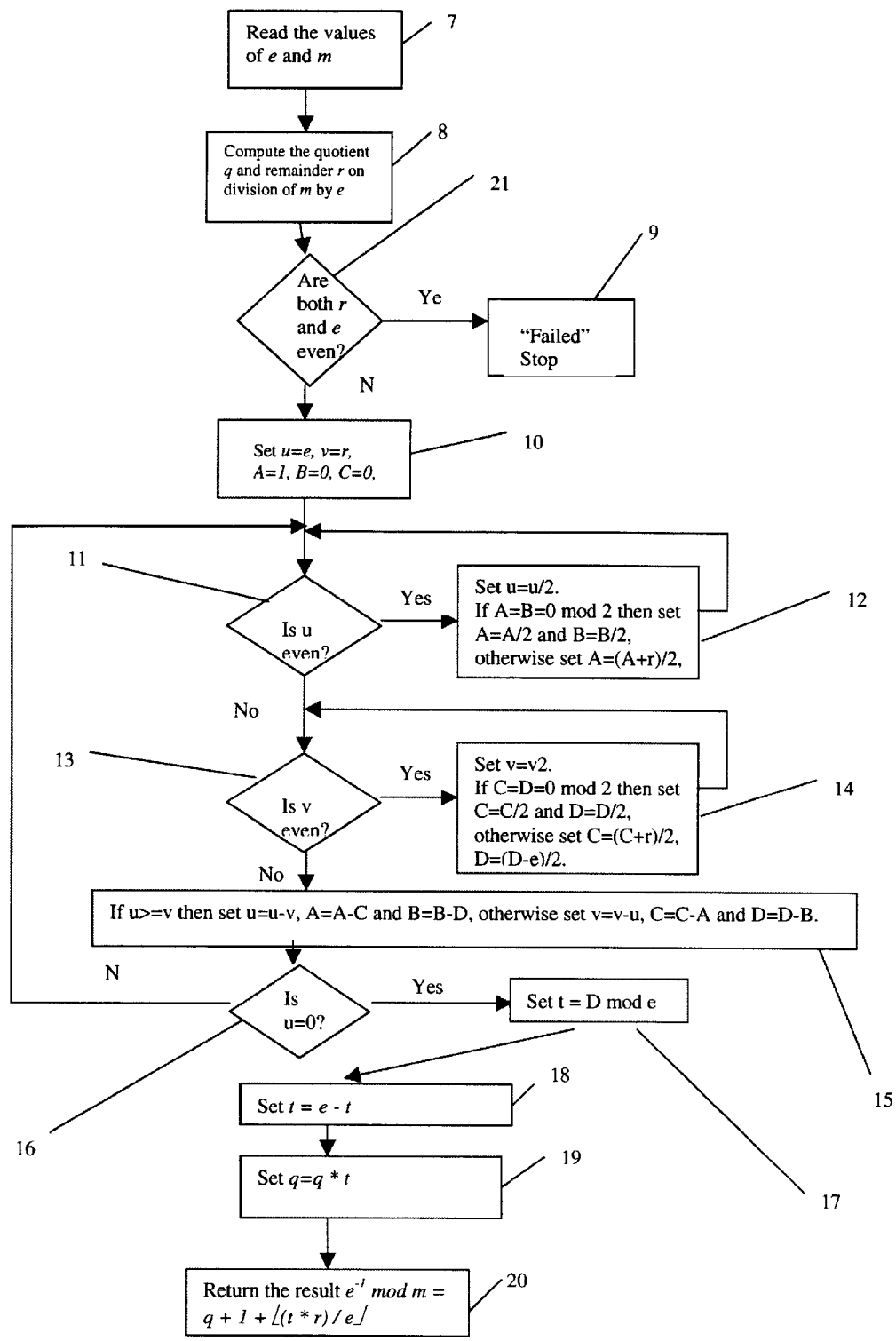
FIG. 2 shows a flow chart of a method for computing the modular inverse using the extended Euclidean algorithm to perform the inversion modulo the small parameter e, according to a second embodiment of the invention.

To further illustrate the process described above, numerical examples of the calculations will now be provided. For the sake of simplicity, the value of the parameter m chosen is not of a size which would be used in a realistic implementation. The values chosen are:

Inputs e=4, m=176567;

Following the process of FIG. 2, step 7 involves simply reading in the values of e and m.

Thereafter:

Step 8: Compute q=integer part of m/e=integer part of 176567/4=44141.

Compute r=m mod e=176567 mod 4=3.

Step 9: e is even, but r is not, so continue.

Step 10: Set u=e=4, v=r=3, A=1, B=0, C=0, D=1.

Step 11: u is even so perform step 12 until u is odd.

First execution of step 12: Set u=u/2=4/2=2, A=(A+r)/2= (1+3)/2=2 and B=(B−e)/2=(0−4)/2=−2.

Second execution of step 12: Set u=u/2=2/2=1, A=A/2= 2/2=1 and B=B/2=−2/2=−1.

Step 13: v is odd so move on to step 15.

Step 15: Set v=v−u=3−1=2, C=C−A=0−1=−1 and D=D−B=1−(−1)=2.

Step 16: u is not 0, so go back to step 11.

Step 11: u is odd, so go to step 13.

Step 13: v is even, so execute step 14 until v is odd.

First execution of step 14: Set v=v/2=2/2=1, C=(C+r)/2=(1+3)/2=2 and D=(D−e)/2=(2−4)/2=−1.

Step 15: Set u=u−v=−1=0, A=A−C=1−2=−1 and B=B−D=1−(−1)=2.

Step 17, set the inverse t=D mod e=−1 mod 4=3.

Step 18: Compute t=e−t=4−3=1.

Step 19: Compute q=q*t=44141*1=44141.

Step 20: Compute q+1+integer part of ((t*r)/e)=44141+1+integer part of ((1*3)/4)=44142.

It will be noted that 44142*e mod m=44142*4 mod 176567=176568 mod 176567=1, verifying that the answer is correct. It should also be noted that in steps 9–17 no large numbers appear. All operands are of the order of e rather than that of m.

It will be apparent that the embodiments described above with reference to FIGS. 1 and 2 provide a mechanism of computation of the required inverse which can reduce the workspace requirements in the instance of large values of m, as long as e is small. This is because the inversion in the intermediate steps is actually being performed with respect to e rather than m. By using the computation of $m^{-1}$ mod e to give the value of $e^{-1}$ mod m, for small values of e the potentially large memory resource usage of the temporary workspace used for the conventional inversion computations may be significantly reduced. Then the intermediate inversion may be performed using simple operations on variables of size the word size of the computer, rather than using multiple precision arithmetic as would be necessitated by the naïve existing approach. Such a situation is typically encountered, as has been mentioned, in the computation of RSA keys, and as such the idea of this disclosure will find application in such computations within memory constrained devices, such as smart cards.

In addition, the use of the simpler method described above will typically enable the computation to be performed in software rather than requiring hardware support. Also any hardware constraints (such as the constraint that the modulus for the inversion be odd) which could hamper implementation of the inversion using the methods of the prior art, are sidestepped by the present invention, since the intermediate inversion operation uses e as a modulus and this is odd.

Furthermore, code size will be reduced because the need to implement inversion methods designed to handle arbitrary length integers is obviated. Only a few simple multiple precision operations need be supported instead. Performance of the present invention is also typically superior to that of an implementation of the methods of the prior art in the domain of interest, i.e. for small values of e.

It will be appreciated that although only two particular embodiments of the invention have been described in detail, various modifications and improvements can be made by a person skilled in the art without departing from the scope of the present invention.

What is claimed is:

1. A method of determining a modular inverse $e^{-1}$ mod m of a data value e utilized in an RSA™ cryptographic system to generate a private exponent d used to determine an RSA™ private key for the cryptographic system, the method comprising the steps of:

(i) determining the value of the data value e:

(ii) determining a value of m for the inversion;

(iii) calculating the value of m mod e by determining a remainder value r of m divided by e;

(iv) determining an inverse $t=r^{-1}$ mod e; and (v) determining the modular inverse $e^{-1}$ mod m utilising at least the value t.

2. A method of determining a modular inverse according to claim 1, wherein the step (v) of determining the modular inverse $e^{-1}$ mod m utilising at least the value t comprises the steps of:

(i) determining a value w=e−t; and (ii) determining $e^{-1}$ mod m by computing (q*w)+1+the integer part of ((w*r)/e).

3. A method of determining a modular inverse according to claim 1, wherein, in the step (iv) of determining an inverse $t=a^{-1}$ mod e, e is a prime number and:

$t=a^{-1}$ mod e=$a^{e-2}$ mod e.

4. A method of determining a modular inverse according to claim 1, wherein, in the step (iv) of determining an inverse $t=a^{-1}$ mod e, e is any number and t is determined using the extended Euclidean algorithm.

5. A method of determining a modular inverse according to claim 1, wherein, in the step (iv) of determining an inverse $t=a^{-1}$ mod e, e is any number and t is determined using the binary extended GCD algorithm.

6. A method of determining a modular inverse according to claim 1, wherein method is carried out by a processor on a smartcard.

* * * * *